(12) United States Patent
Nandyalam et al.

(10) Patent No.: US 9,083,625 B2
(45) Date of Patent: Jul. 14, 2015

(54) COMMUNICATION WITH COMPONENTS USING COMPONENT-INDEPENDENT DRIVER

(71) Applicant: VCE Company, LLC, Marlborough, MA (US)

(72) Inventors: Rajesh Nandyalam, Whitinsville, MA (US); Venkatesh Madhipatla, Westford, MA (US); Neil Russell, Burlington, MA (US); Victor Zhang, Plano, TX (US)

(73) Assignee: VCE Company, LLC, Richardson, TX (US)

( * ) Notice: Subject to any disclaimer, the term of this patent is extended or adjusted under 35 U.S.C. 154(b) by 153 days.

(21) Appl. No.: 13/731,869

(22) Filed: Dec. 31, 2012

(65) Prior Publication Data
US 2014/0059570 A1 Feb. 27, 2014

Related U.S. Application Data

(60) Provisional application No. 61/693,221, filed on Aug. 24, 2012.

(51) Int. Cl.
G06F 3/00 (2006.01)
H04L 12/24 (2006.01)
G06F 9/54 (2006.01)
(Continued)

(52) U.S. Cl.
CPC ............. *H04L 41/12* (2013.01); *G06F 9/4411* (2013.01); *G06F 9/54* (2013.01); *G06F 11/008* (2013.01); *G06F 11/3051* (2013.01); *H04L 41/022* (2013.01); *H04L 41/0233* (2013.01); *H04L 41/0856* (2013.01); *G06F 11/3086* (2013.01); *H04L 43/0817* (2013.01); *Y04S 40/162* (2013.01); *Y04S 40/168* (2013.01)

(58) Field of Classification Search
CPC ............................... G06F 9/541; G06F 9/4411
USPC .................................................. 719/310, 327
See application file for complete search history.

(56) References Cited

U.S. PATENT DOCUMENTS 8,065,660 B1 * 11/2011 Tanner et al. .................. 717/121
8,122,261 B2 * 2/2012 Sakamura et al. ............ 713/193
(Continued)

FOREIGN PATENT DOCUMENTS

WO    WO 2011128596 A1    10/2011

OTHER PUBLICATIONS

John Hannon, Recommemding Twitter Users to Follow Using Content and Collaborative Filtering approaches, Sep. 26, 2010.*
(Continued)

*Primary Examiner* — Lechi Truong
(74) *Attorney, Agent, or Firm* — Womble Carlyle Sandridge & Rice, LLP

(57) ABSTRACT

An improved technique for communicating with components of an electronic system includes operating a driver according to a designated protocol but agnostically to the components themselves. Information about particular system components is supplied to the driver by respective data sources. To obtain discovery information about a component, the driver accesses a data source for the component and communicates with the component using the designated protocol. The driver thus operates merely as a conduit for component-specific information, which is supplied by the data sources rather than by the driver itself.

18 Claims, 5 Drawing Sheets

(51) Int. Cl.
*G06F 11/00* (2006.01)
*G06F 9/44* (2006.01)
*G06F 11/30* (2006.01)
*H04L 12/26* (2006.01)

(56) References Cited

U.S. PATENT DOCUMENTS

| | | | |
|---|---|---|---|
| 8,627,275 B1* | 1/2014 | Belov et al. | 717/106 |
| 2006/0047925 A1* | 3/2006 | Perry | 711/162 |
| 2009/0100178 A1* | 4/2009 | Gonzales et al. | 709/226 |
| 2013/0091180 A1 | 4/2013 | Vicat-Blanc-Primet et al. | |
| 2013/0110799 A1* | 5/2013 | Hoppe et al. | 707/705 |

OTHER PUBLICATIONS

Case, Fedor, Schoffstall, & Davin, "A Simple Network Management Protocol (SNMP)" May 1990.
Distributed Management Task Force, Inc. and WBEM Solutions, Inc., "CIM Tutorial" 2003.
Cisco Systems, Inc., "CISCO UCS Manager XML API Programmers Guide", Apr. 21, 2011.
English language translation of WO 2011128596, Vicat-Blanc-Primet et al. Oct. 20, 2011.

* cited by examiner

COMMUNICATION WITH COMPONENTS USING COMPONENT-INDEPENDENT DRIVER

This application claims the benefit of provisional application No. 61/693,221, filed Aug. 24, 2012, which is hereby incorporated by reference in its entirety.

BACKGROUND

Manufacturers of data center components, such as network switches, storage arrays, and computing blades, generally supply their customers with drivers for allowing operating systems and programs to communicate with the components. The drivers for the components are generally specific to particular component types. For example, one driver may be provided for a particular type of server blade, another driver may be provided for a particular type of disk array, and yet another driver may be provided for a particular type of network switch.

The components used in data centers typically employ a variety of protocols. For example, network components of a data center often communicate using SNMP (Simple Network Management Protocol), storage arrays typically communicate using CIM (Common Interface Model), and certain computing blades and assemblies communicate using XML-APIs.

In a conventional arrangement, a data center is constructed from a variety of network, storage, and compute components, and an administrator communicates with the components using the drivers supplied with the respective components.

SUMMARY

Unfortunately, the task of managing drivers for data center components has become increasingly difficult. As data centers grow and include more and more components, they typically require more and more drivers. Administrators are thus required to install and keep current a large number of drivers.

Sometimes, drivers do not exist for particular components and custom drivers must be written and maintained. As drivers are usually provided as compiled executable code, each change to a driver requires a new software release. A consequence can often be "code churn," where developers find themselves continually churning out new software releases to keep up with desired driver modifications.

In contrast with the prior approach, an improved technique for communicating with components of a system includes operating a driver according to a designated protocol but agnostically to the components themselves. Information about particular system components is supplied to the driver by respective data sources. Each data source includes a set of predefined references for a particular component type, where each reference identifies a discoverable characteristic of that component type. To obtain discovery information about a component, the driver accesses the data source for that component and communicates with the component using the designated protocol. The driver applies a set of component-independent constructs to the set of references identified in the data source and obtains the information identified by the references from the component. The driver may then output the component-specific information to populate a configuration record of the system.

The driver can thus operate merely as a conduit for component-specific information, which is supplied by the data sources rather than by the driver itself. Preferably, the data sources are provided in an uncompiled form, such as in computer-readable text files (e.g., XML), which can be readily updated and enhanced without requiring any software compilation. Changes to component-specific driver functionality can thus be achieved by changing the data sources alone, without making any changes to the compiled code set. Similarly, new component types can be added to the system by supplying a new data source and without any changes to compiled code. Modifications to driver functionality and additions of new component types are thus greatly simplified.

Certain embodiments are directed to a method of communicating with components of an electronic system. The method includes receiving, by a driver configured to communicate in a designated protocol, requests to obtain discovery information from multiple components of the electronic system. The method further includes operating the driver, in response to the requests and for each of the components, including: accessing a data source for a component type of the respective component, the data source including a set of predefined component-specific references that specify discoverable characteristics of the component; requesting, in the designated protocol and via a set of generic, component-independent constructs of the driver, the information specified by the set of predefined references in the data source for the respective component; receiving, in the designated protocol, the requested information from the respective component; and storing the received information in a configuration record.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for communicating with components of a system includes operating a driver according to a designated protocol but agnostically to the components themselves.

Figure 1:
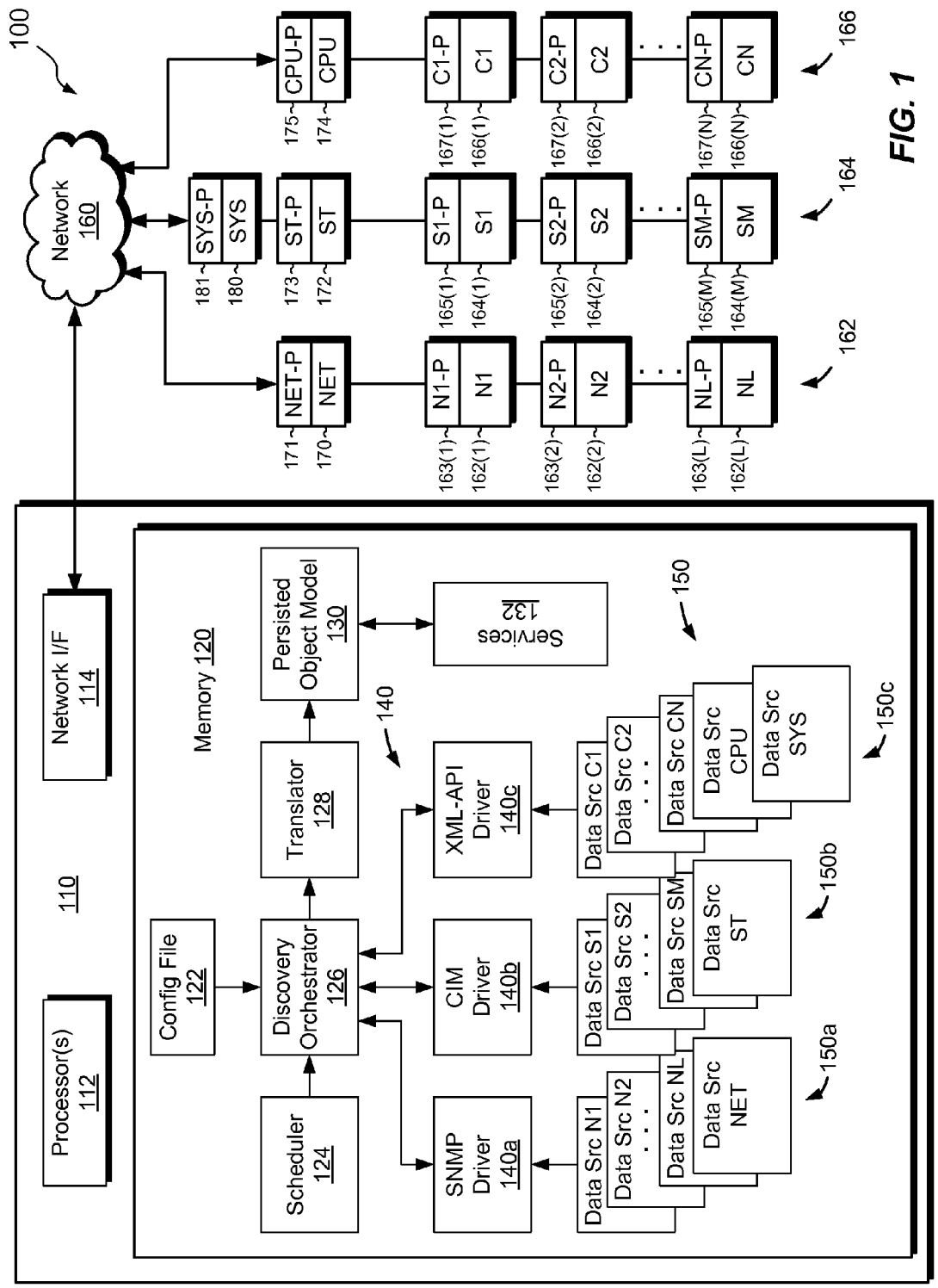
FIG. 1 is a block diagram of an example electronic system in which improved techniques according to embodiments of the invention can be practiced.

FIG. 1 shows an example electronic system 100 in which embodiments of the improved technique hereof can be practiced. The electronic system 100 includes a computerized apparatus 110 and a network 160, as well as network components 162, storage components 164, and compute components 166. In an example, the electronic system 100 is provided in the form of a preconfigured, converged IT infrastructure system. Systems of this kind may be used to implement cloud-based solutions and/or other data center functions, which involve storing data and/or hosting applications on behalf of enterprises, organizations, and/or individual users. An example of a converged infrastructure system of this type is the Vblock™ system available from VCE Company, LLC, of Richardson, Tex.

The network components 162 of the electronic system 100 include individual components 162(1)-162(L). In the example shown, each of the network components 162 is of a different type, i.e., component 162(1) is of type N1, component 162(2) is of type N2, and component 162(L) is of type NL. The different types may refer to different makes and models of switches, routers, and other network equipment. Similarly, the storage components 164 include individual components 164(1)-164(M). In the example shown, each of the storage components 164 is of a different type, i.e., component 164(1) is of type S1, component 164(2) is of type S2, and component 164(M) is of type SM. The different types may refer to different makes and models of storage arrays, SANs, and storage processors, for example. Also, the compute components 166 include individual components 166(1)-166(N). In the example shown, each of the storage components is also of a different type, i.e., component 166(1) is of type C1, component 166(2) is of type C2, and component 166(N) is of type CN. The different types may refer to different makes and models of CPU blades, for example. Although only one component of each type is shown for network, storage, and compute components, it is understood that the electronic system 100 can include any number of components of any given type.

In an example, the computerized apparatus 110 acts as a single control point for administering and maintaining the network, storage, and compute components 162, 164, and 166. The computerized apparatus 110 includes a set of processors 112 (e.g., one or more processing chips and/or assemblies), a network interface 114, and memory 120. The memory 120 includes both volatile memory (e.g., RAM) and non-volatile memory (e.g., one or more disk drives, flash drives, and/or ROMs and the like). The memory 120 includes instructions, which, when run by the set of processors 120, cause the set of processors 120 to carry out the various processes and functions as described herein.

The memory 120 stores various constructs. These include, for example, a configuration file 122, a scheduler 124, a discovery orchestrator 126, a translator 128, a persisted object model 130, and services 132. The discovery orchestrator 126 is arranged in communication with various component-independent drivers 140a-c, for performing discovery operations and/or control of components (e.g., components 162, 164, and 166). In an example, each of the drivers (generically, 140) is configured to communicate using a respective protocol. For example, the driver 140a is configured to communicate using SNMP, the driver 140b is configured to communicate using CIM, and the driver 140c is configured to communicate using XML-API. Each of the drivers 140 is component-independent, meaning that it is not required to include any instructions or data specific to any component type. Rather, instructions and/or data pertaining to particular component types are provided via respective data sources 150. In an example, data sources 150a provide component type specific instructions and/or data to the SNMP driver 140a (e.g., for network component types N1-NL). Similarly, data sources 150b provide component type specific instructions and/or data to the CIM driver 140b (e.g., for storage component types S1-SM), and data sources 150c provide component type specific instructions and/or data to the XML-API driver 140c (e.g., for compute component types C1-CN).

Preferably, the drivers 140a-c are compiled software constructs and the data sources are computer-readable text files. For example, the drivers 140a-c are compiled Java executable code and the data sources 150a-c are XML files. The data sources each store a set of predefined component-specific references that specify discoverable characteristics of the respective component type.

Referring back to components 162, 164, and 166, it is seen that each component has a respective "provider," i.e., a software interface that allows the component to communicate on the network 160. For example, the network components 162 (1-L) have providers 163(1-L), the storage components 164 (1-M) have providers 165(1-M), and the compute components 166(1-N) have providers 167(1-N). Each provider has a unique address on the network 160, which can be a unique global IP address, a unique private address, or a unique address of some other kind. Each provider communicates in accordance with a particular protocol. For example, providers 163(1-L) communicate using SNMP, providers 165(1-M) communicate using CIM, and providers 167(1-N) communicate using XML-API. Each provider supplies a mechanism for accessing and setting information about the respective component. For example, an SNMP provider supplies a mechanism for accessing and setting a component's MIB (Management Information Base). As is known, entries in a component's MIB are indexed using object IDs (OIDs). An external requestor can thus call the provider for an SNMP component specifying a set of OIDs and receive back the data stored for those OIDs in the component's MIB. Although MIBs typically follow certain standards, many components employ custom MIBs. Those MIBs are made available to administrators and developers to facilitate communication and control. CIM and XML-API providers typically provide object models for accessing component information and/or changing component settings. An external requestor can thus call the provider for a CIM or XML-API component specifying particular objects or object properties, and receive back the data stored for those objects or object properties in the component's object model.

The electronic system 100 also includes aggregating components (e.g., components 170, 172, 174, and 180). The aggregating components each include a respective group of components (sub-components) and provide administrative and control features for the sub-components in the respective groups. For example, a network aggregating component 170 provides administrative and control features for the network components 162. Likewise, storage and compute aggregating components 172 and 174 provide administrative and control features for the storage components 164 and the compute components 166, respectively. A system aggregating component 180 provides administrative and control features for all components, including components 162, 164, and 166, as well as lower-level aggregating components 170, 172, and 174.

In an example, the aggregating components 170, 172, 174, and 180 are software constructs and may be stored anywhere in the electronic system 100, including in the computerized system 110. Each of the aggregating components has a respective provider (e.g., one of the providers 171, 173, 175, and 181) Like the providers for the components 162, 164, and 166, the providers 171, 173, 175, and 181 each have a unique address on the network 160. The computerized apparatus 110 communicates with the providers 171, 173, 175, and 181 using respective drivers and data sources. Thus, the computerized apparatus 110 administers and controls aggregating components the same way it administers and controls individual components.

In operation, the computerized apparatus 110 performs a discovery procedure to obtain information about components installed in the electronic system 100. The scheduler 124 initiates discovery at predefined times and/or in response to predefined events (e.g., power up and/or configuration changes). The discovery orchestrator 126 reads the configuration file 122 (e.g., an XML file) to obtain a list of installed components. In an example, the list of installed components includes network addresses (e.g., IP addresses) of component providers, credentials for accessing the providers, identifiers (IDs) of data sources for the components, and protocols for the components.

For each component listed in the configuration file 122, the discovery orchestrator 126 passes a request for discovery information to the driver 140 for the identified protocol. In an example, the request includes the IP address, credentials, and data source ID for the component. For instance, if the configuration file 122 indicates that the component uses SNMP with data source N2, the discovery orchestrator 126 sends a request to the SNMP driver 140a. The request includes the IP address of the component provider, the credentials, and the value of N2.

The driver 140 receives the request and proceeds to conduct discovery on the component. For example, the driver 140 accesses the referenced data source 150 and constructs calls for the data specified in the set of predefined references (OIDs, classes, etc.) provided in the data source 150. The calls are generated via a set of component-independent constructs within the driver 140 (e.g., instructions, functions, and/or class methods), which apply the references from the data source 150 to make specific calls to the component's provider. The calls go out over the network 160. The provider returns the requested data to the driver 140. The driver 140 may then store the received data in a local configuration record, e.g., a data structure within the driver 140 or elsewhere. When the driver 140 has requested all discoverable characteristics of the component identified in the data source and the data have been returned, the driver 140 returns the configuration record for the component to the discovery orchestrator 126. In an example, the discovery orchestrator 126 passes the configuration record to the translator 128, which translates the configuration record into an instance for the component in the persisted object model 130.

In an example, the driver 140 is built using the Java Spring Framework, and the data source (e.g., an XML file) is Spring-injected into the driver 140 during the driver's execution, to allow component-specific operation.

The persisted object model 130 may store discovery information for all components of the electronic system 100. The action of the discovery orchestrator 126 performing the above operations on all components identified in the configuration file 122 results in a complete instance of all installed components of the electronic system 100 being stored in the persisted object model 130. In an example, the persisted object model 130 is implemented using a relational database, such as PostgreSQL. Once data for all components are stored in the persisted object model 130, services 132 may be invoked to allow administration and control of the electronic system 100. The services 132 include, for example, displaying to users system configuration information reflecting actual discovered data read from the persisted object model 130, displaying performance metrics, including overall system health metrics, establishing system-wide and/or component-specific settings, and running tests.

The arrangement of the computerized system 110 maintains drivers 140 as component-independent constructs while allowing component-specific operation through the use of the data sources 150. The computerized system 110 can thus be readily adapted for accommodating new components without requiring new releases of compiled code. Introduction of new component types is handled simply by updating the configuration file 122 and providing new data sources. Changes can be made to obtain different data from components or performing different component-specific operations simply by changing the data sources. The electronic system 100 thus provides a degree of extendibility and ease of upgrade not available using prior approaches.

Figure 2:
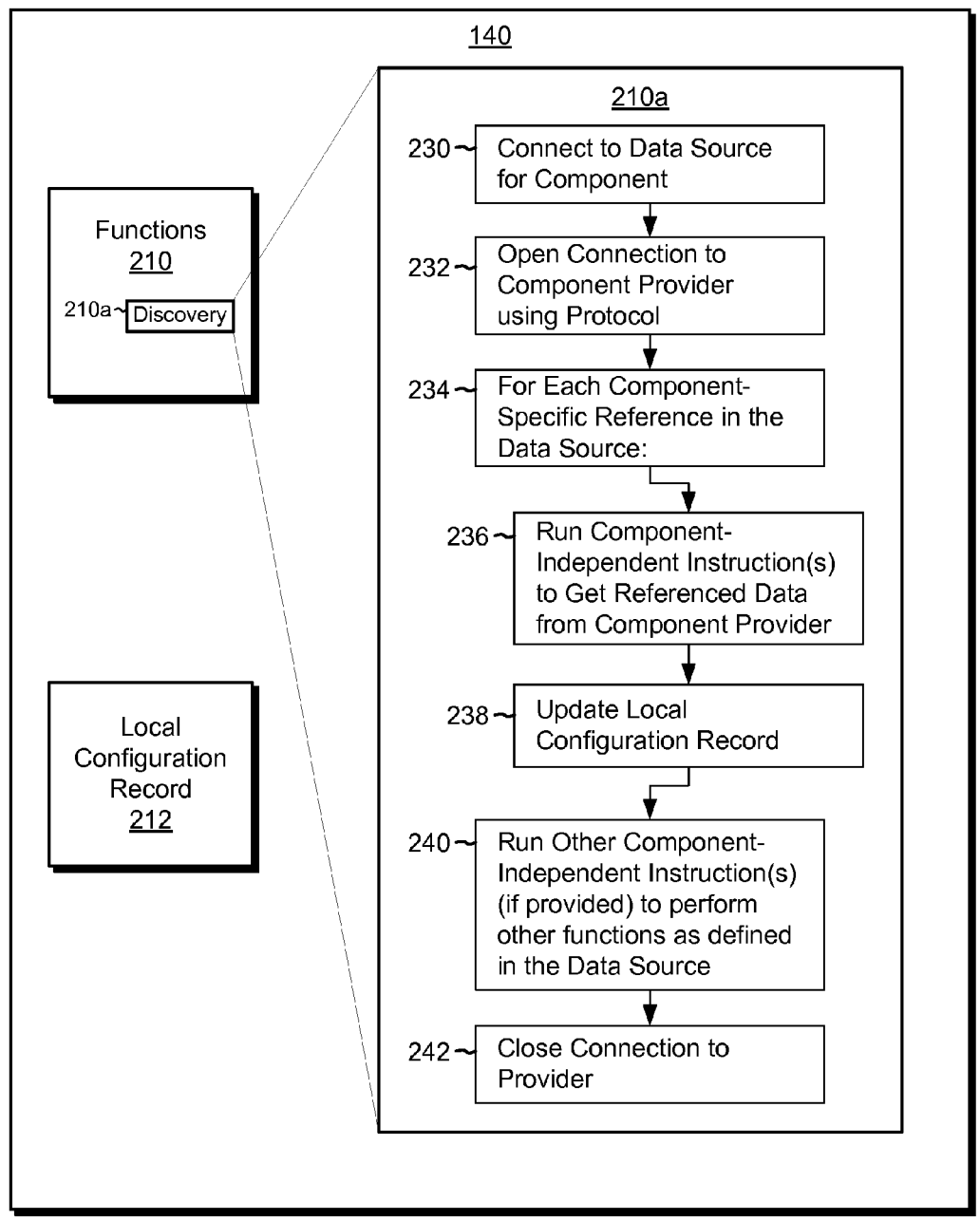
FIG. 2 is a block diagram of an example component-independent driver of claim 1.

FIG. 2 shows an example implementation of a driver 140. The illustrated implementation is applicable to any of the drivers 140a-c. The driver 140 includes functions 210 and a local configuration record 212. The functions 210 include various instructions, routines, object methods, and/or procedures, and the like. Although the functions 210 may include programming functions (e.g., Java functions) in the formal sense, this is not required. Rather, the functions 210 refer to any sets of instructions for performing respective operations. The local configuration record 212 includes a data structure, such as an array, a component-independent object instance, or some other component-independent structure, for storing discovery data obtained by the driver 140 for a particular component or set of components.

The functions 210 include a discovery function 210a, which is shown in greater detail in the expanded region of the figure. Here, various instructions are shown for performing discovery on a particular component, e.g., in response to a request for discovery from the discovery orchestrator 126. The illustrated instructions are shown generically; it is understood, however, that at least some of the instructions are tailored for use with a respective protocol. The instructions of the function 210a are independent of any particular component/component type.

At instruction 230, the discovery function 210a operates to "Connect to Data Source for Component." In one example, the discovery function 210a executes this instruction by opening the data source 150 (e.g., an XML file) for reading. In another example, the discovery function 210a uses the Java Spring Framework to Spring-inject the data source into the driver 140.

At instruction 232, the discovery function 210a operates to "Open Connection to Component Provider using Protocol." In an example, the discovery function 210a runs the instruction 232 by creating a protocol-specific call to the component's provider. The call applies the network address and credentials the driver 140 received from the discovery orchestrator 126 to identify the component's provider and gain access to its data. In some examples, a communication session is opened with the provider, which may remain open until explicitly closed or until a designated time limit (session timeout) is exceeded.

Instruction 234 identifies a group of instructions that may be executed "For Each Component-Specific Reference in the Data Source." These may include instructions 236 and 238. As indicated previously, each data source 150 includes a set of predefined component-specific references that specify discoverable characteristics of the component. These references apply to any component of the component type for which the data source is provided. Where the data source is an XML file, the component specific references may be specified within designated tags, using a format such as follows, for example:

```
<REF>
    <REFName>Discoverable Characteristic 1</REFName>
    <REFData>[Data descriptor of the discoverable
    characteristic]</REFData>
</REF>
```

At instruction 236, the driver 140 operates to "Run Component-Independent Instruction(s) to Get Referenced Data from Component Provider." Continuing with the example above, the discovery function 210a may execute the instruction 236 by forming a call to the component's provider in accordance with the designated protocol and passing to the provider the contents of the <REFData> tag from the XML file. For SNMP, for example, the discovery function 210a of the driver 140a executes the instruction 236 by sending an SNMPGET or similar instruction to the component's provider specifying the "Data descriptor of the discoverable characteristic." For CIM or XML-API, the discovery function 210a of the driver 140b or 140c can execute the instruction 236 by sending an "EnumerateInstances" or similar instruction to the component's provider specifying the "Data descriptor of the discoverable characteristic."

At instruction 238, the discovery function 210a receives back the requested data from the provider and updates the local configuration record 212. Preferably, steps 236 and 238 are repeated until the data specified for all component-specific references in the data source 150 have been obtained.

Control may then proceed to instruction 240, whereupon the discovery function 210a operates to "Run Other Component-Independent Instruction(s) (if provided) to perform other functions as defined in the Data Source." Instruction 240 thus allows for a range of operations besides obtaining data from the provider.

In one example, the data source 150 defines calculations to be performed on multiple data items obtained from a provider, such as to compute a health metric of the component or to make other assessments of the component's status based on multiple factors. The discovery function 210a, upon encountering such definitions in the data source 150, may invoke others of the functions 210 to effect the desired calculations.

In another example, the data source 150 defines constructs for writing data to a component provider and thus changing the associated component's state. For instance, the data source 150 has a construct with the following form:

```
<SETUP>
    <SETName>Item to Set 1</SETName>
    <SETData>[Data to be sent]</SETData>
</SETUP>
```

When the discovery function 210a encounters the above construct in the data source 150, the discovery function 210a may perform a protocol-specific call to the component's provider. For example, for SNMP, the call to the provider may take the form of an "SNMPSET" instruction specifying the "Data to be sent."

In some examples, the data source 150 is configured to support complex tasks, which are executed by the discovery function 210a. For example, sequential code can be programmed in XML data sources using XML-PRC or similar technologies. Arbitrarily complex driver functionality can thus be achieved using component-independent drivers operating with such data sources.

Once such instructions 240 are run, the discovery function 210a may execute an instruction 242 to "Close Connection to Provider." The instruction may thus act to terminate a communication session with the provider or to close the connection by other means.

One skilled in the art will recognize that the instructions shown for the discovery function 210a can be operated in any suitable order. For example, the order of instructions 230 and 232 can be reversed. Also, while some protocols require explicit instructions to open and close connections to providers, others may not. Thus, instructions 230 and 242 may not be necessary for some protocols or in some examples. Further, instruction 240 can be run virtually at any time. The order of instructions shown in FIG. 2 should thus be regarded as merely illustrative.

It is evident from FIG. 2 that the driver 140 need not include any component-specific data or instructions. Rather, the driver 140 provides a generic framework into which component-specific information is provided through the use of data sources. Although the discovery function 210a of the driver 140 is described with reference to a single component, it is understood that the driver 140 can be operated with any number of components. Also, the driver 140 can be operated with any component type that uses a protocol for which the driver 140 is configured and for which a data source 150 has been defined.

Figure 3:
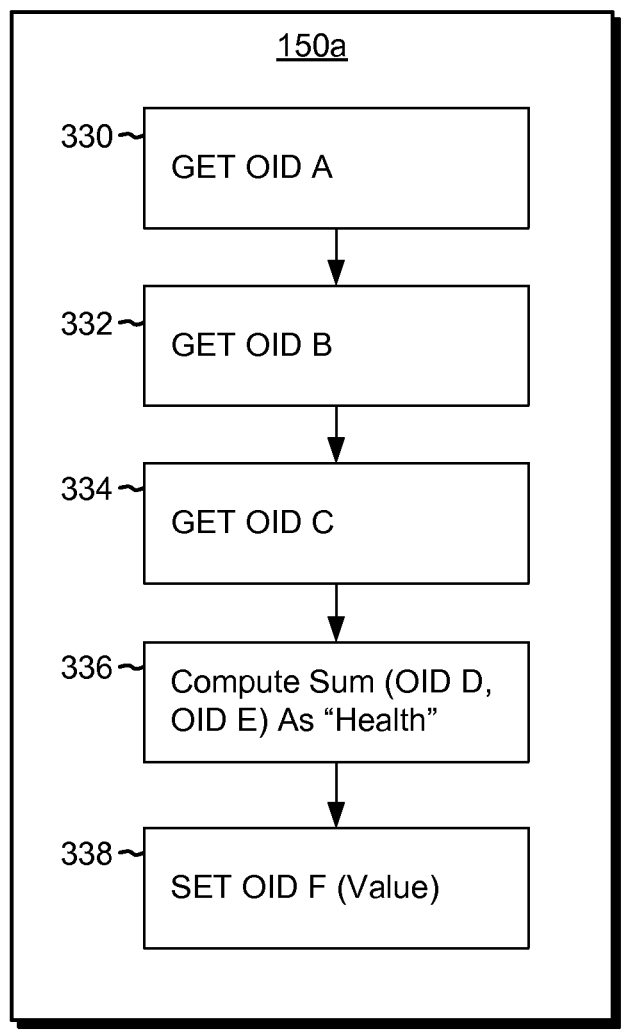
FIG. 3 is a block diagram of an example data source for an SNMP-based component type of claim 1.

FIG. 3 shows an example implementation of a data source 150a for SNMP. The data source 150a is seen to include a set of predefined component-specific references (OIDs) that specify discoverable characteristics of SNMP-based components of the component type for which the data source 150a is provided. For example, entry 330 lists a component-specific reference to get the discoverable characteristic identified by "OID A" from a component's provider. Similarly, entries 332 and 334 list component-specific references to get the discoverable characteristics identified by "OID B" and "OID C."

In an example XML implementation, the data source 150a provides the entry 330 using the following format:

```
<REF>
    <REFName>Discoverable Characteristic A</REFName>
    <REFData>OID A</REFData>
</REF>
```

Entries 332 and 334 may be set forth in similar ways. The data source 150a may include any number of entries like the entry 330 for referencing any desired data about a component that can be found in the component's MIB.

Entry 336 shows an arrangement where two references are provided ("OID D" and "OID E"), along with an indication to compute a sum of data returned for the references and to refer to the result by the name "Health." In an example, the entry 336 includes sub-entries, like the entry 330, to define references for OID D and OID E. The entry 336 also includes sub-entries to direct a sum of the data returned by these references to be computed and given the name "Health." In an example, the driver 140a, upon encountering the entry 336, performs SNMPGET or similar instructions to obtain OID D and OID E and adds the results to provide "Health," which the driver 140a may stores in the local configuration record 212.

Entry 338 differs from the preceding entries by specifying data to be written to the component. Here, the data specified by "Value" is to written to the MIB of the component identified at "OID F." In an example, the driver 140a, upon encountering the entry 338, performs an SNMPSET or similar instruction to write "Value" to the component's MIB.

Figure 4:
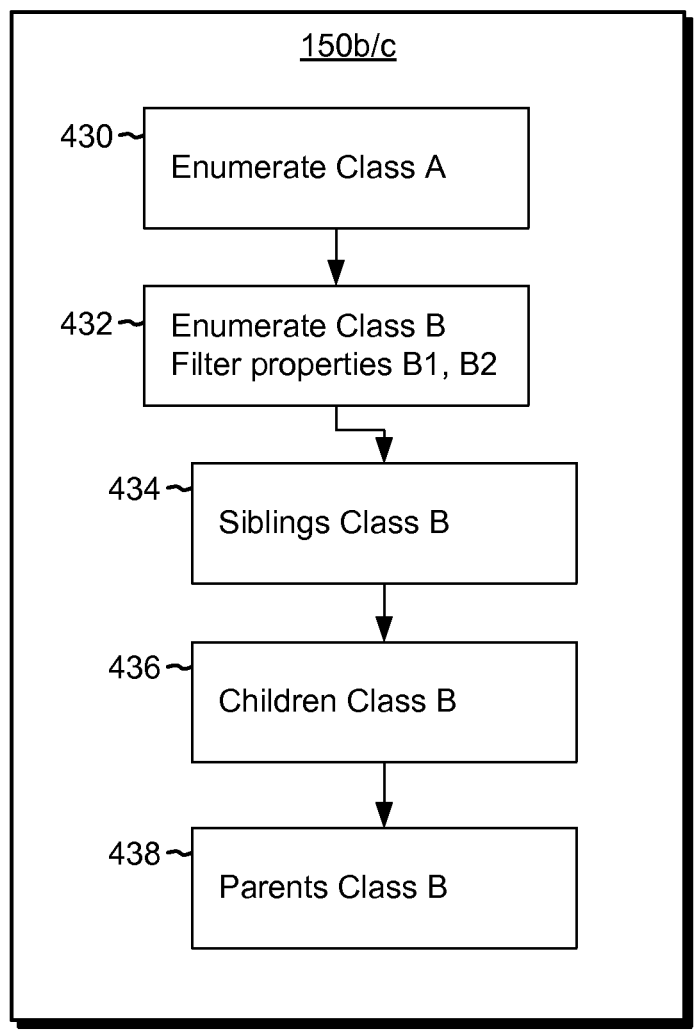
FIG. 4 is a block diagram of an example data source for a CIM-based or XML-API-based component type of claim 1.

FIG. 4 shows an example implementation of a data source 150b/c, which applies to both CIM and XML-API. The data source 150b/c is seen to include a set of predefined component-specific references (classes) that specify discoverable characteristics of CIM/XML-API-based components of the component type for which the data source 150b/c is provided.

For example, entry 430 provides a component-specific reference to get the discoverable characteristic(s) identified by "CLASS A" from a component's provider. Any number of entries like the entry 430 may be included. In an example, the driver 140b/c, upon encountering the entry 430, executes an EnumerateInstances or similar instruction to get the referenced data (e.g., via instruction 236 of FIG. 2). In some examples, the data returned to the driver 140b/c includes data for an entire object instance, including data for multiple properties and sub-object instances. In an example XML implementation, the data source 150b/c provides the entry 430 using the following format:

```
<REF>
    <REFName>Discoverable Characteristic A</REFName>
    <REFData>Class A </REFData>
</REF>
```

Entry 432 is similar to entry 430 but refers to "Class B" and includes filter criteria, e.g., for properties B1 and B2. The filter properties alert the driver 140b/c when enumerating Class B to request only those object instances and properties of Class B that meet the filter criterion. In this fashion, specifically targeted data can be obtained from component providers and "data dumps" are avoided.

Entry 432 is seen to include sub-entries 434, 436, and 438. These sub-entries are provided to alert the driver 140b/c to traverse the object model of the provider to obtain component-specific data relating to sibling object instances to Class B (sub-entry 434), children object instances of Class B (sub-entry 436), and parent object instances of Class B (sub-entry 438).

The data source 150b/c for CIM and XML-API thus provides flexibility for obtaining information about object instances and related object instances, as well as for filtering results to avoid unnecessary network traffic and storage.

Figure 5:
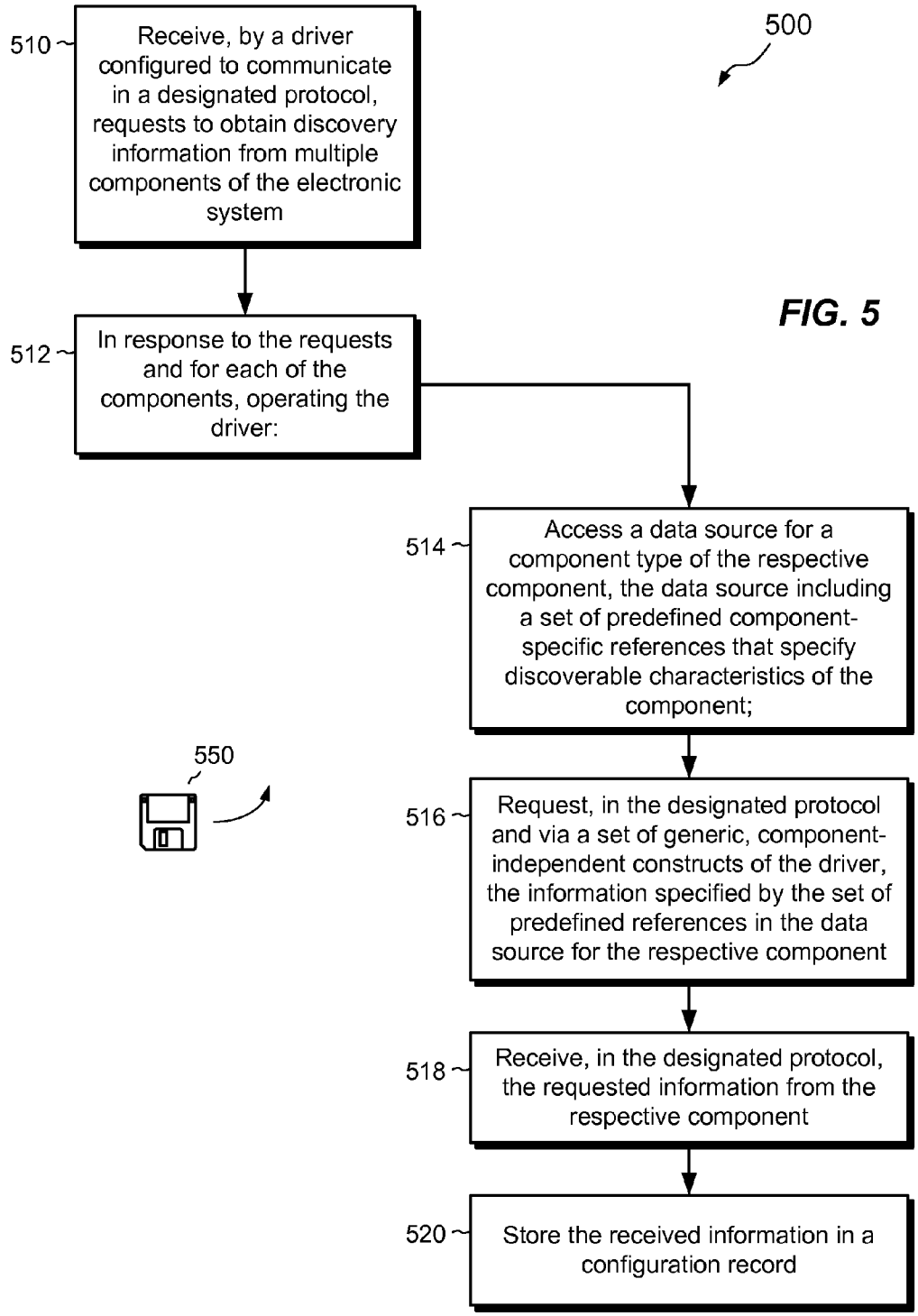
FIG. 5 is a flow chart of an example process for performing discovery of multiple components of the electronic system of FIG. 1 using the component independent driver of FIG. 2 and a data source of any of FIGS. 3 and 4.

FIG. 5 illustrates a process 500 for communicating with components of an electronic system. The process 500 may be carried out in connection with the computing environment 100 and is typically performed by the software constructs described in connection with FIGS. 1-4, which reside in the memory 120 of the computerized apparatus 110 and are run by the set of processors 112. The various acts of the process 500 may be ordered in any suitable way. Accordingly, embodiments may be constructed in which acts are performed in orders different from those illustrated, which may include performing some acts simultaneously, even though the acts are shown as sequential in the illustrated embodiments.

At step 510, a driver configured to communicate in a designated protocol receives requests to obtain discovery information from multiple components of the electronic system. For example, any of the drivers 140a-c is configured to communicate in a respective protocol (e.g., SNMP, CIM, or XML-API), and to receive, e.g., from the discovery orchestrator 126, requests to obtain discovery information from multiple components (e.g., any of components 162, 164, 166, 170, 172, 174, and 180).

At step 512, the driver is operated to perform discovery in response to the requests and for each of the components, by performing steps 514, 516, 518, and 520.

At step 514, the driver accesses a data source for a component type of the respective component. The data source includes a set of predefined component-specific references that specify discoverable characteristics of the component. For example, if the component is the network component 162(2) (N2), the driver 140a accesses the data source 150a for component type N2 (e.g., via instruction 230 of FIG. 2). The data source N2 includes a set of predefined component-specific references (e.g., OIDs, as shown and described in connection with FIG. 3).

At step 516, the driver requests, in the designated protocol and via a set of generic, component-independent constructs of the driver, the information specified by the set of predefined references in the data source for the respective component. For example, the driver 140a executes the instruction 236 to request, using SNMP, the data indicated in the OIDs listed in the data source 150a for N2.

At step 518, the driver receives, in the designated protocol, the requested information from the respective component. For example, the driver 140a receives information returned from the provider 163(2) (N2-P) of component 162(2) in response to executing the instruction 236.

At step 520, the received information is stored in a configuration record. For example, the data returned in response to the instruction 236 is stored in the local configuration record 212.

An improved technique has been described for communicating with components of an electronic system. The technique includes operating a driver according to a designated protocol but agnostically to the components themselves. Information about particular system components is supplied to the driver by respective data sources. To obtain discovery information about a component, the driver accesses a data source for the component type of the component and communicates with the component using the designated protocol. The driver thus operates merely as a conduit for component-specific information, which is supplied by the data sources rather than by the driver itself. Additions of new component types and changes to existing component-specific driver functionality can thus be achieved by changing the data sources alone, without making any changes to the compiled code set. Modifications to driver functionality and additions of new component types are thus greatly simplified.

As used throughout this document, the words "comprising," "including," and "having" are intended to set forth certain items, steps, elements, or aspects of something in an open-ended fashion. Although certain embodiments are disclosed herein, it is understood that these are provided by way of example and that the invention is not limited to these particular embodiments.

Having described certain embodiments, numerous alternative embodiments or variations can be made. For example, separate drivers 140a-c have been shown and described for communicating with components in respective protocols. This is merely an example, however. Alternatively, a single driver may be provided for all protocols, where the driver includes different computing paths for different protocol-specific operations.

Also, although examples are given for SNMP, CIM, and XML-API, it is understood that the invention is not limited to these protocols. In any given implementation, different numbers and/or types of protocols may be supported.

Also, examples have been described in which data sources are implemented with XML files. However, data sources may alternatively be implemented with JavaScript Object Notation (JSON), delimited text files, databases, and/or with other uncompiled, machine-readable formats.

Also, the configuration record has been shown and described as a data structure of the driver 140. However, it is understood that the configuration record may be stored anywhere and need not be stored in a single location. For example, different parts of the configuration record may be stored in different locations of the electronic system 100 or elsewhere.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 of FIG. 5). Multiple computer-readable media may be used. The medium (or media) may be encoded with instructions which, when executed on one or more processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of communicating with components of an electronic system, comprising:
   receiving, by a driver configured to communicate in a designated protocol, requests to obtain discovery information from multiple components of the electronic system, wherein the multiple components include a plurality of network components, a plurality of storage components and a plurality of compute components; and
   in response to the requests and for each of the components, operating the driver, including:
   accessing a data source for a component type of a respective component, the data source including a set of predefined component-specific references that specify discoverable characteristics of the component, wherein the set of predefined component-specific references includes a filter for limiting the results of an enumerate instruction executed by the driver to a set of desired characteristics, and wherein accessing the data source for each component of the electronic system includes accessing different data sources for different components of the electronic system;
   requesting, in the designated protocol and via a set of generic, component-independent constructs of the driver, information specified by the set of predefined references in the data source for the respective component;
   receiving, in the designated protocol, the requested information from the respective component; and
   storing the received information in a configuration record.

2. The method of claim 1, wherein the driver is a compiled software construct executable by a set of processors of the electronic system, and wherein each data source is an uncompiled computer-readable construct located outside the driver.

3. The method of claim 1, wherein each of the components has an associated provider that has a unique network address on a network of the electronic system, wherein receiving the requests to obtain discovery information from multiple components includes receiving the unique network address of the provider of each of the respective components.

4. The method of claim 1, wherein at least one of the components is an aggregating component that includes multiple sub-components, the aggregating component having a provider that has a unique network address and each of the sub-components having a provider that has a unique network address.

5. The method of claim 1, wherein the protocol is one of:
   (i) Simple Network Management Protocol (SNMP), (ii) Common Interface Model (CIM), or (iii) XML-API.

6. The method of claim 1,
   wherein the protocol is SNMP,
   wherein the set of predefined component-specific references of each of the data sources for the components includes SNMP object IDs (OIDs), each OID indicating a data object stored in a MIB (management information base) for the respective component type, and
   wherein requesting, by the driver, the information specified by the set of predefined references includes executing an SNMP get instruction for each OID specified in a respective data source.

7. The method of claim 1,
   wherein the protocol is CIM,
   wherein the set of predefined component-specific references of each of the data sources for the components includes CIM classes, and
   wherein requesting, by the driver, the information specified by the set of predefined references includes executing an enumerate instruction for each class specified in the respective data source.

8. The method of claim 1, wherein the set of predefined component-specific references includes a set of relationships among different CIM classes listed in the respective data source.

9. The method of claim 1, wherein the set of predefined component-specific references includes a metric indicating a health status of the component.

10. The method of claim 1, further comprising:
    receiving a new component of a new type in the electronic system; receiving a new data source specific to the new type of component;
    operating the driver to obtain discovery information about the new component, the driver including no modifications in the compiled software construct to accommodate the new component; and
    translating the configuration record into an instance for the new component in a persisted object model.

11. The method of claim 1, wherein the driver is built using a Java Spring Framework, and wherein accessing the data source includes Spring-injecting the data source for the respective component into the driver.

12. A computerized apparatus, comprising:
    a set of processors; and
    memory, coupled to the set of processors, the memory storing executable instructions, which when executed by the set of processors cause the set of processors to perform a method of communicating with components of an electronic system, wherein the method comprises:

receiving, by a driver configured to communicate in a designated protocol, requests to obtain discovery information from multiple components of the electronic system, wherein the multiple components include a plurality of network components, a plurality of storage components and a plurality of compute components; and in response to the requests and for each of the components, operating the driver, including:

accessing a data source for a component type of a respective component, the data source including a set of predefined component-specific references that specify discoverable characteristics of the component, wherein the set of predefined component-specific references includes a filter for limiting the results of an enumerate instruction executed by the driver to a set of desired characteristics, and wherein accessing the data source for each component of the electronic system includes accessing different data sources for different components of the electronic system;

requesting, in the designated protocol and via a set of generic, component-independent constructs of the driver, information specified by the set of predefined references in the data source for the respective component;

receiving, in the designated protocol, the requested information from the respective component; and storing the received information in a configuration record.

13. The computerized apparatus of claim 12, wherein the driver is a compiled software construct executable by the set of processors, and wherein each data source is an uncompiled computer-readable construct stored in the memory outside the driver.

14. The computerized apparatus of claim 12,
wherein the protocol is SNMP,
wherein the set of predefined component-specific references of each of the data sources for the components includes SNMP object IDs (OIDs), each OID indicating a data object stored in a MIB (management information base) for the respective component type, and
wherein requesting, by the driver, the information specified by the set of predefined references includes executing an SNMP get instruction for each OID specified in a respective data source.

15. The computerized apparatus of claim 12, wherein the driver is built using a Java Spring Framework, and wherein accessing the data source includes Spring-injecting the data source for the respective component into the driver.

16. A non-transitory computer readable medium including instructions which, when executed by a set of processors of a computerized apparatus, cause the set of processors to perform a method of communicating with components of an electronic system, the method comprising:

receiving, by a driver configured to communicate in a designated protocol, requests to obtain discovery information from multiple components of the electronic system, wherein the multiple components include a plurality of network components, a plurality of storage components and a plurality of compute components; and in response to the requests and for each of the components, operating the driver, including:

accessing a data source for a component type of a respective component, the data source including a set of predefined component-specific references that specify discoverable characteristics of the component, wherein the set of predefined component-specific references includes a filter for limiting the results of an enumerate instruction executed by the driver to a set of desired characteristics, and wherein accessing the data source for each component of the electronic system includes accessing different data sources for different components of the electronic system;

requesting, in the designated protocol and via a set of generic, component-independent constructs of the driver, information specified by the set of predefined references in the data source for the respective component;

receiving, in the designated protocol, the requested information from the respective component; and storing the received information in a configuration record.

17. The computerized apparatus of claim 16,
wherein the driver is a compiled software construct executable by the set of processors, wherein each data source is an uncompiled computer-readable construct, wherein the protocol is CIM,
wherein the set of predefined component-specific references of each of the data sources for the components includes CIM classes, and
wherein requesting, by the driver, the information specified by the set of predefined references includes executing an enumerate instruction for each class specified in a respective data source.

18. The computerized apparatus of claim 16, wherein the driver is built using the Java Spring Framework, and wherein accessing the data source includes Spring-injecting the data source for the respective component into the driver.

* * * * *